United States Patent Office 3,637,642
Patented Jan. 25, 1972

3,637,642
**PROCESS FOR DISSOLVING INSOLUBLE COLLA-
GEN EMPLOYING A MIXTURE OF AN ALKALI
METAL HYDROXIDE, AN ALKALI METAL
SULFATE, AND AN AMINE**
Tadahiko Fujii, Tokyo, Japan, assignor to Nihon Hikaku
Kabushiki Kaisha, Tokyo, Japan
No Drawing. Continuation of application Ser. No.
758,685, Sept. 10, 1968. This application Mar. 20,
1970, Ser. No. 19,553
Claims priority, application Japan, Sept. 16, 1967,
42/59,201
Int. Cl. C09h *1/00, 1/04, 3/00*
U.S. Cl. 260—118
8 Claims

ABSTRACT OF THE DISCLOSURE

A process for dissolving insoluble collagen in an aqueous medium in which insoluble collagen is treated with an aqueous solution containing alkali metal hydroxide, alkali metal sulfate and a small amount of a lower primary or secondary amine and then, after desalting, treated with an acid solution of a pH less than 4.0.

This application is a continuation of Ser. No. 758,685, filed Sept. 10, 1968.

BACKGROUND OF THE INVENTION

In this specification and claims "insoluble collagen" means a collagen that cannot be usually dissolved in an aqueous alkaline or an inorganic salt solution.

Many processes for dissolving insoluble collagen in an aqueous solution in which collagen is dissolved in mono-molecular state have been proposed. The prior arts teach the methods of treating insoluble-collagen in aqueous acid solutions with various enzymes to obtain the collagen solution; that is, U.S.P. 3,034,852 and 3,121,049 deal with the use of a proteolytic enzyme obtained from animal viscera, B.P. 1,090,967 deals with the use of enzymes obtained from Aspergilli and B.P. 1,119,342 employs enzymes produced from penicillium. Further, U.S.P. 3,314,861 discloses dissolving insoluble collagen in an aqueous medium by the treatment with an enzyme having an optimum pH between 2 to 10 for milk casein in the presence of a cationic surfactant or a water soluble salt of divalent metal.

Collagens are classified into three kinds, according to solubility:

(1) Neutral-salt-soluble collagen which is capable of being dissolved in an aqueous neutral-salt solution such as 0.5 M aqueous sodium chloride solution, (2) Acid-soluble collagen which is capable of being dissolved in an acid solution such as citrate buffer (citric acid plus sodium citrate) or dilute acetic acid solution, and (3) Insoluble collagen which cannot be dissolved in such solutions.

A collagen molecule is constructed with three polypeptide chains. These chains of neutral-salt-soluble collagen are substantially not cross-linked. By the time of biological maturation of soluble collagen two or three of these chains are cross-linked intra-molecularly and covalently, as in the case of acid-soluble collagen. The molecules of these soluble collagents have specific parts, telopeptides, at the ends of the molecules. The structure of the telopeptides differs significantly from that of the backbone polypeptide chains. The telopeptides are relatively easily attacked by enzymes; the backbones stay intact. The insoluble collagen is further cross-linked. Thus, in the case of calf skin, two or more macromolecules are also intermolecularly and covalently cross-linked at the telopeptides (thereby insolubilizing the soluble-collagen having only intra-molecular cross-linking). With further biological aging (i.e. as the calf skin becomes steer hide) additional intra- and inter-molecular cross-linking takes place. The telopeptide portions in soluble collagen are attacked by a proteolytic enzyme, and thereby solubilization of insoluble collagen can be carried out. However, the enzyme digestion of the telopeptide portions of the insoluble collagen of steer hide is very slow as compared with the analogous digestion of calf skin because of the additional cross-linking.

N. T. Crosby and G. Stainsby reported in Research 15 p. 427 (1962) that the insoluble collagen of calf skin is partially dissolved by treating it with 5% aqueous sodium hydroxide solution saturated with sodium sulfate at 20° C. for five days. K Kühn, E. Zimmer, P. Waykole and P. Fietzek also reported in Z. Physiol. Chem. 333,209 (1963) that the insoluble collagen of calf skin is completely dissolved by the same process.

If the above-described process is applied to the insoluble collagen of steer hide (of adult animal), the yield of dissolved collagen is very low, due to the abundance of cross-links compared to calf skin.

SUMMARY OF THE INVENTION

It has been found that if the insoluble collagen of adult animal is treated with an aqueous alkali metal hydroxide and alkali metal sulfate solution containing a small amount of an organic base such as an amine, the action of alkali on the telopeptide portions is greatly accelerated and the insoluble collagen is converted into its soluble form. Then, upon treating with acid solution, the collagen is dissolved to obtain collagen solution.

In general, collagen swells in an aqueous caustic alkali solution. However, sodium sulfate present in the solution inhibits such swelling of collagen. Thus, lowering of the denaturation temperature of collagen due to alkali is prevented. Accordingly, the process according to this invention may be carried out at a relatively high temperature.

Any primary or secondary amine containing from 0 to 5 carbon atoms may be employed in this process. The amine may be any form, straight, branched or cyclic. Typical amines are monomethylamine, dimethylamine, hydrazine, ethylenediamine, hydroxylamine, piperidine and piperazine. Other useful amines may be selected by anyone skilled in the art.

The amine concentration is from 0.05 to 0.3 M. The concentration of alkali metal hydroxide such as sodium and potassium hydroxide is from 0.3 to 1.0 N. The concentration of alkali metal sulfate such as sodium sulfate and potassium sulfate is from 10% to 25% (w./v.). The temperature of treatment is from 15° to 25° C. and the time is from five to fourteen days. In general, if the concentration of alkali metal sulfate is decreased or the concentration of alkali is increased, the temperature of treatment should be decreased.

The amine accelerates the hydrolysis due to alkali of only the telopeptide in the collagen; the backbone of the collagen is not hydrolyzed and the structure of the monomeric collagen molecules is not grossly impaired. This differs from the prior art, for example U.S. Pat. 2,184,494, in which collagen is treated with aqueous calcium hydroxide solution containing amine similar to those employed in this invention, since said combination hydrolyzes not only telopeptides but also the backbone of collagen thereby breaking it down into lower molecular weight material. Accordingly, an important feature of this invention is that the amine acts so as to insure that only the telopeptide portion and not the backbone of the insoluble collagen is attacked by the alkali.

After the alkali treatment, the collagen fiber slurry is neutralized with any acid, such as hydrochloric, sulfuric, acetic, citric or lactic acid. Then the slurry is thoroughly washed with water to remove the salt. The telopeptide portions in the collagen so treated are broken down and the fiber swells but there is no significant change in appearance.

Accordingly, the collagen fiber can be easily extracted with an acid solution to obtain collagen solution. Usable acids include hydrochloric, sulfuric, acetic, citric and lactic acids. The pH is adjusted to below 4.0. The amount of acid employed is adjusted so as to give a desired pH and concentration of collagen. The concentration of the resulting solution is usually about 8% by weight.

The collagen molecule in collagen solution obtained according to this invention was examined for intrinsic viscosity, flow birefringence, sedimentation by ultracentrifugal analysis and optical rotation and it has been determined that collagen molecules in the solution are monomolecularly dissolved and retain their original structure. The solution can be extruded into regenerated collagen articles, such as fiber, film and tube by a conventional process.

A further important feature of this invention is that the collagen fiber, the collagen solution or the regenerated collagen fiber obtained according to this invention can be converted to gelatin by heating the collagen solution or the collagen fiber in water at a temperature above the denaturation temperature of collagen. The resulting gelatin possesses an isoionic point of about 4.9 which is the same value as that of gelatin obtained by the liming process and it differs from the gelatin produced from the insoluble collagen by enzyme process only in respect to the isoionic point.

Commercial gelatins are usually manufactured by liming unhaired raw hide for a long time, for example from 60 to 90 days, and by gelatinizing the limed hide in several extraction steps with warm water. The quality of the gelatins so obtained decreases with each succeeding extraction stage. In contrast, according to this invention, a gelatin having high quality and uniform molecular weight can be produced by only a single extraction step after alkali-pretreatment of less than two weeks.

PREFERRED EMBODIMENT OF THE INVENTION

Example 1

Insoluble collagen fiber was obtained from hide as follows.

The butt of steer hide was unhaired and water-washed, then split to remove grain and flesh sides. The remaining intermediate layer (corium) which contains a larger amount of collagen than the others was washed with water and soaked in 10% aqueous salt solution, then ground by a meat mill with cooling to obtain a slurry. In order to remove the neutral-salt-soluble and acid-soluble collagens which exist in a very small amount, the slurry was soaked in a 10% aqueous salt solution and in a 0.15 M citrate buffer for one to two days, then washed again with water. After adjusting the pH of the slurry to 7.0 by sodium hydroxide, the slurry was water-washed and the fiber was dehydrated with ethyl alcohol.

Then the collagen fiber was defatted with a mixture of ethyl alcohol and ethyl ether (1:1) and dried to obtain insoluble collagen fiber.

The fiber was treated as follows:

Collagen fiber: 100 g.
NaOH: 20 g.
$Na_2SO_4$: 160 g.
Monomethylamine: 6.21 g.
Volume of the solution: 1 l.
Temperature of treatment: 20° C.
Duration of treatment: 2 weeks.

During the treatment the collagen fiber was agitated for a short time a few times every day. Thereafter, the slurry was neutralized with acid, such as sulfuric, hydrochloric, acetic, citric or lactic acid. Then the slurry was washed to remove all the salts. Finally the collagen fiber was extracted with acid solution, for example acetic acid solution at a pH below 4.0, for one day under agitation and the amount of the acid was adjusted so as to obtain collagen solution of a concentration about 8%. After the extraction it was desirable to filter the solution in order to remove a small amount of non-collagenous materials remaining in the solution.

It was found that the molecular weight of the collagen in the solution was about 300,000; the molecule was 2800 A. in length, 15 A. in diameter, and had a rigid rod like structure constructed of three polypeptide chains and was monomolecularly dissolved in the aqueous medium. When the collagen solution was spun through a nozzle into a coagulation bath according to a conventional process; the collagen was completely recovered as fiber.

When the collagen fiber slurry neutralized and washed, the collagen solution, or the regenerated collagen fiber dispersed in water was heated over the denaturation temperature of collagen, for example, to from about 50° to 60° C., the three polypeptide chains were separated into individual chains to form gelatin having a uniform molecular weight and an isoionic point of about pH 4.9.

Example 2

Steer bone was treated with 1.2 N hydrochloric acid for seven days during which the acid was replaced by fresh solution everyday to obtain ossein containing a large amount of collagen. To obtain the insoluble collagen the ossein was treated, as in Example 1, but alkali-treatment was as follows:

Collagen fiber: 100 g.
NaOH: 20 g.
$Na_2SO_4$: 100 g.
Dimethylamine: 4.5 g.
Volume of solution: 1 l.
Temperature: 15° C.
Duration: 2 weeks Then the collagen fiber slurry was neutralized, washed and extracted with acid as in Example 1.

The resulting collagen solution had the same properties as the product of Example 1 and could be converted to regenerated fiber and gelatin.

Examples 3–6

Collagen fiber as in Example 1 was treated according to the procedures of Example 1, but alkali-treatment was as follows.

| Example | 3 | 4 | 5 | 6 |
|---|---|---|---|---|
| Liquid/fiber ratio | 10 | 10 | 10 | 10 |
| Collagen fiber, g | 100 | 100 | 100 | 100 |
| NaOH, g | 32 | 32 | 28 | 40 |
| $Na_2SO_4$, g | 250 | 160 | 160 | 160 |
| Hydrazine ($H_2N-NH_2.H_2O$), g | 15 | | | |
| Ethylenediamine, g | | 12 | | |
| Hydroxylamine sulfate, g | | | 16.4 | |
| Piperazine, g | | | | 4.3 |
| Temperature, °C | 25 | 20 | 20 | 20 |
| Duration (week) | 1 | 1 | 1 | 1 |

Example 7

The procedures of Example 2 were followed but alkali-treatment conditions were as follows.

Liquid/fiber ratio: 10
Collagen fiber: 100 g.
NaOH: 20 g.
$Na_2SO_4$: 100 g.
Piperidine: 17 g.

The properties of the collagen solution obtained by Examples 3 to 7 were the same as those in Examples 1 and 2. The collagens could be converted to regenerated fiber and gelatin.

What is claimed is:

1. In a process for converting insoluble collagen to a soluble product in which said collagen is contacted with an aqueous solution of an alkali metal hydroxide and an alkali metal sulfate, the improvement which comprises:
   (a) soaking a source of insoluble collagen fibers in said solution while an amine having from 0-5 carbon atoms and being a primary or secondary amine, hydrazine or hydroxylamine is dissolved in the solution, said amine being present in said solution in an amount of 0.05 to 0.3 mole per liter.
   (b) agitating said source of fibers and said solution for a time sufficient to convert said solution and said source to a slurry of collagen fibers while maintaining the structure of the monomeric collagen units in said fibers;
   (c) neutralizing said slurry;
   (d) removing the salts formed by said neutralization from said slurry; and
   (e) recovering collagen in soluble form from said desalted, neutralized slurry.

2. In a process as set forth in claim 1, said solution being substantially 0.3 to 2.0 normal respect to said alkali metal hydroxide, the concentration of said alkali metal surfate in said solution being approximately 100 to 250 grams per liter, and said amine being hydrazine, hydroxylamine, a primary or secondary lower-alkylmine, a lower-alkylamine, piperidine, or piperazine, the temperature of said solution during said soaking, agitating, neutralizing, and removing being below the denaturation temperature of said collagen in said solution.

3. In a process as set forth in claim 2, said recovering of collagen in soluble form including the contacting of said collagen with an aqueous liquid having a pH lower than 4.0 until the collagen is dissolved in said liquid.

4. In a process as set forth in claim 3, said recovering of collagen in soluble form further including the precipitation of said dissolved collagen from said liquid as regenerated soluble collagen.

5. In a process as set forth in claim 4, said regenerated soluble collagen being heated to a temperature above the denaturation temperature thereof while in contact with an aqueous medium until converted to gelatin.

6. In a process as set forth in claim 3, the solution of said collagen in said liquid being heated to a temperature above the denaturation temperature of said collagen until said collagen is converted to gelatin.

7. In a process as set forth in claim 2, said recovering of collagen values including the heating of the collagen above the denaturation temperature thereof while in contact with an aqueous medium until said collagen is converted to gelatin.

8. In a process as set forth in claim 2, said insoluble collagen fibers being fibers of adult animal hide.

References Cited

UNITED STATES PATENTS

| 2,184,494 | 12/1939 | Glass et al. | 260—118 |
| 2,460,809 | 2/1949 | Oamschroder et al. | 260—118 |

OTHER REFERENCES

Research, vol. 15, 1962, pp. 427–435, Crosby et al.
Chem. Abstracts, vol. 65, 1966, 20381c-d, Shestakova.
Chem. Abstracts, vol. 65, 1966, 20381g-h, Babloyan.
Chem. Abstracts, vol. 68, 1968, 115724k, Babloyan.
Chem. Abstracts, vol. 69, 1968, 87990u, Babloyan et al.
Chem. Abstracts, vol. 68, 1968, 968172, Babloyan et al.

HOWARD E. SCHAIN, Primary Examiner

U.S. Cl. X.R.

260—123.7